United States Patent
Alharbi

(10) Patent No.: US 12,352,297 B2
(45) Date of Patent: Jul. 8, 2025

(54) HYDRAULIC CYLINDER WITH INFLATABLE SEALS

(71) Applicant: Saudi Arabian Oil Company, Dhahran (SA)

(72) Inventor: Naif Mohsen Mosleh Alharbi, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 18/485,788

(22) Filed: Oct. 12, 2023

(65) Prior Publication Data

US 2025/0122895 A1  Apr. 17, 2025

(51) Int. Cl.
*F15B 15/14* (2006.01)
*F16J 15/46* (2006.01)

(52) U.S. Cl.
CPC ........ *F15B 15/1452* (2013.01); *F15B 15/149* (2013.01); *F16J 15/46* (2013.01)

(58) Field of Classification Search
CPC .. F16J 15/46; F16J 15/48; F16J 15/149; F16J 15/3284; F15B 15/1452
See application file for complete search history.

(56) References Cited

U.S. PATENT DOCUMENTS

| | | | | |
|---|---|---|---|---|
| 1,481,160 | A * | 1/1924 | Switzer | F16J 15/20 92/252 |
| 2,452,714 | A * | 11/1948 | Barnard | F16J 15/48 92/244 |
| 4,103,592 | A * | 8/1978 | Davis | F01D 17/145 91/415 |
| 8,292,301 | B1 * | 10/2012 | Gilstad | F16J 15/324 277/567 |
| 8,403,337 | B1 * | 3/2013 | Gilstad | F04B 53/143 277/645 |
| 8,763,687 | B2 * | 7/2014 | Ingram | E21B 33/1208 166/187 |
| 9,567,821 | B2 * | 2/2017 | Bramwell | E21B 33/1208 |
| 2004/0017047 | A1 * | 1/2004 | Taylor | F16J 15/164 277/434 |
| 2011/0133869 | A1 | 6/2011 | Yan et al. | |
| 2011/0156357 | A1 * | 6/2011 | Noguchi | F04C 13/008 428/221 |
| 2014/0284046 | A1 | 9/2014 | Bramwell | |
| 2018/0080564 | A1 * | 3/2018 | Tanner | F16J 15/027 |

FOREIGN PATENT DOCUMENTS

CN  102365458  2/2012

* cited by examiner

*Primary Examiner* — Thomas E Lazo
(74) *Attorney, Agent, or Firm* — Fish & Richardson P.C.

(57) ABSTRACT

Systems and devices include a hydraulic cylinder piston including a piston rod having a first end and a second end opposite the first end; a piston head coupled to the first end of the piston rod; and two inflatable seals disposed around an outer circumference of the piston head, each inflatable seal including one or more chambers configured to receive hydraulic fluid to inflate the seal.

18 Claims, 4 Drawing Sheets

HYDRAULIC CYLINDER WITH INFLATABLE SEALS

TECHNICAL FIELD

This disclosure relates to hydraulic systems, for example, for operating steam turbine control valves.

BACKGROUND

A hydraulic cylinder is a mechanical actuator that uses fluid pressure applied to an incompressible fluid to generate linear motion. The hydraulic cylinder provides an output force proportional to the fluid pressure and the surface area of the piston inside the cylinder. The fluid pressure can be provided by, for example, a hydraulic pump.

A double-acting hydraulic cylinder can provide motion and force in two opposite directions. For example, high pressure acting on a first side of the piston and low pressure acting on a second side of the piston can move the piston in a first direction. Reversing the pressures (e.g., low pressure on the first side and high pressure on the second side) reverses the direction of motion and the direction of the applied force.

SUMMARY

This disclosure describes systems and devices for sealing hydraulic cylinders. A hydraulic piston includes a piston head coupled to a piston rod. The piston head includes two dynamic, inflatable seals in sliding contact with interior walls of the hydraulic cylinder. The inflatable seals include chambers that can be filled with hydraulic fluid when hydraulic fluid in contact with the piston is pressurized. The inflatable seals also include an interior cavity in fluid communication with the chambers. Pressurization of the hydraulic cylinder provides hydraulic fluid to the chambers which in turn provide hydraulic fluid to the interior cavity. The hydraulic fluid inflates the seal.

Implementations of the systems and devices of this disclosure can provide various technical benefits. Inflation of the inflatable seals increases the force exerted by the seal on the cylinder wall and the piston improving the sealing performance of the seal and preventing hydraulic fluid seepage from the high pressure side of the piston to the low pressure side of the piston. Preventing hydraulic seepage improves the performance and efficiency of the hydraulic system. Reducing hydraulic fluid seepage past the piston can reduce instances of uncontrolled steam turbine speeds resulting from uncontrolled steam admission into the steam turbine. Inclusion of nano particles in the seals can decrease the coefficient friction between the seals and the cylinder wall or piston rod. Inclusion of nano particles in the seals can increase the damage and wear resistance of the seal to damage or wear caused by debris or contamination in the hydraulic fluid or surrounding environment. The inflatable seals can increase the mean time between failures of the hydraulic system.

The details of one or more embodiments of these systems and methods are set forth in the accompanying drawings and the description below. Other features, objects, and advantages of these systems and methods will be apparent from the description and drawings, and from the claims.

DESCRIPTION OF DRAWINGS

Like reference symbols in the various drawings indicate like elements.

DETAILED DESCRIPTION

This specification describes systems and devices for sealing hydraulic cylinders. Power cylinder includes a piston head coupled to a piston rod. The piston head includes two dynamic, inflatable Nano seals in sliding contact with interior walls of the hydraulic cylinder. The inflatable seals include two chambers that can be filled with hydraulic fluid. The inflatable seals also include an interior cavity in fluid communication with the one or more chambers. Pressurization of the hydraulic cylinder provides hydraulic fluid to the chambers which in turn provide hydraulic fluid to the interior cavity. The hydraulic fluid inflates the seal.

Figure 1:
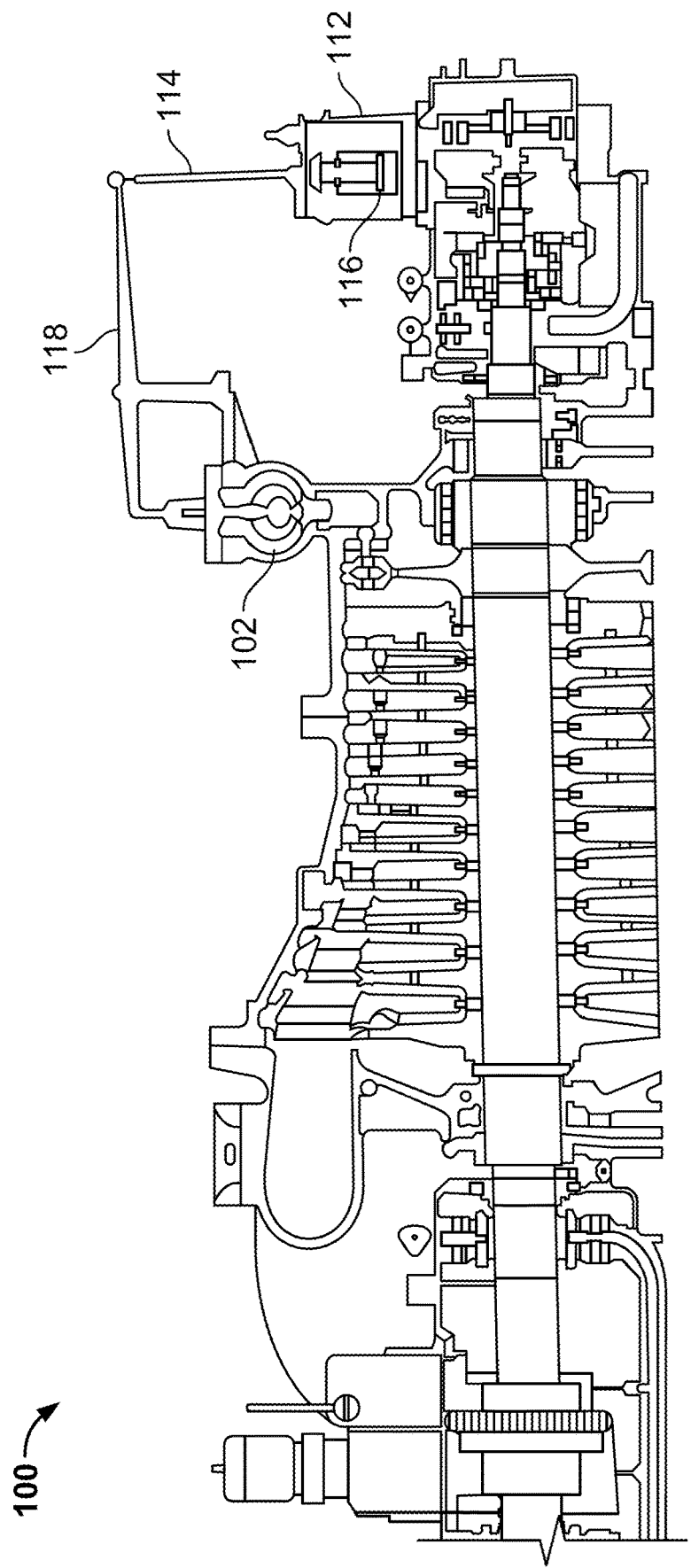
FIG. 1 is a schematic illustration of a steam turbine with a hydraulically operated steam admission valve.

FIG. 1 is a schematic illustration of a steam turbine 100. A steam admission valve 102 controls the amount of steam admitted into the steam chest 104. Controlling the amount of steam admitted to the steam chest 104 controls the operating speed of the steam turbine 100.

The steam admission valve 102 is operated by a hydraulic system 110. The hydraulic system 110 includes a hydraulic cylinder or power cylinder 112. A piston rod 114 extends out of the hydraulic cylinder 112. The piston rod 114 is connected at one end to the piston 116 inside the cylinder 112. At the opposite end, the piston rod 114 is connected to a cross arm 118. The cross arm 118 is coupled to the steam admission valve 102.

The hydraulic cylinder or power cylinder 112 is a double-action hydraulic cylinder (e.g., the hydraulic cylinder 112 can provide motion and force in two opposite directions). The hydraulic cylinder 112 is actuated by providing pressurized hydraulic fluid to one side of the piston 116. The side of the piston 116 to which the pressurized hydraulic fluid is provided determines the direction of motion. For example, pressurized hydraulic fluid provided to the bottom side of the piston 116 will result in upward movement of the piston rod 114. Pressurized hydraulic fluid provided to the top side of the piston 116 will result in downward movement of the piston rod 114.

Figure 2:
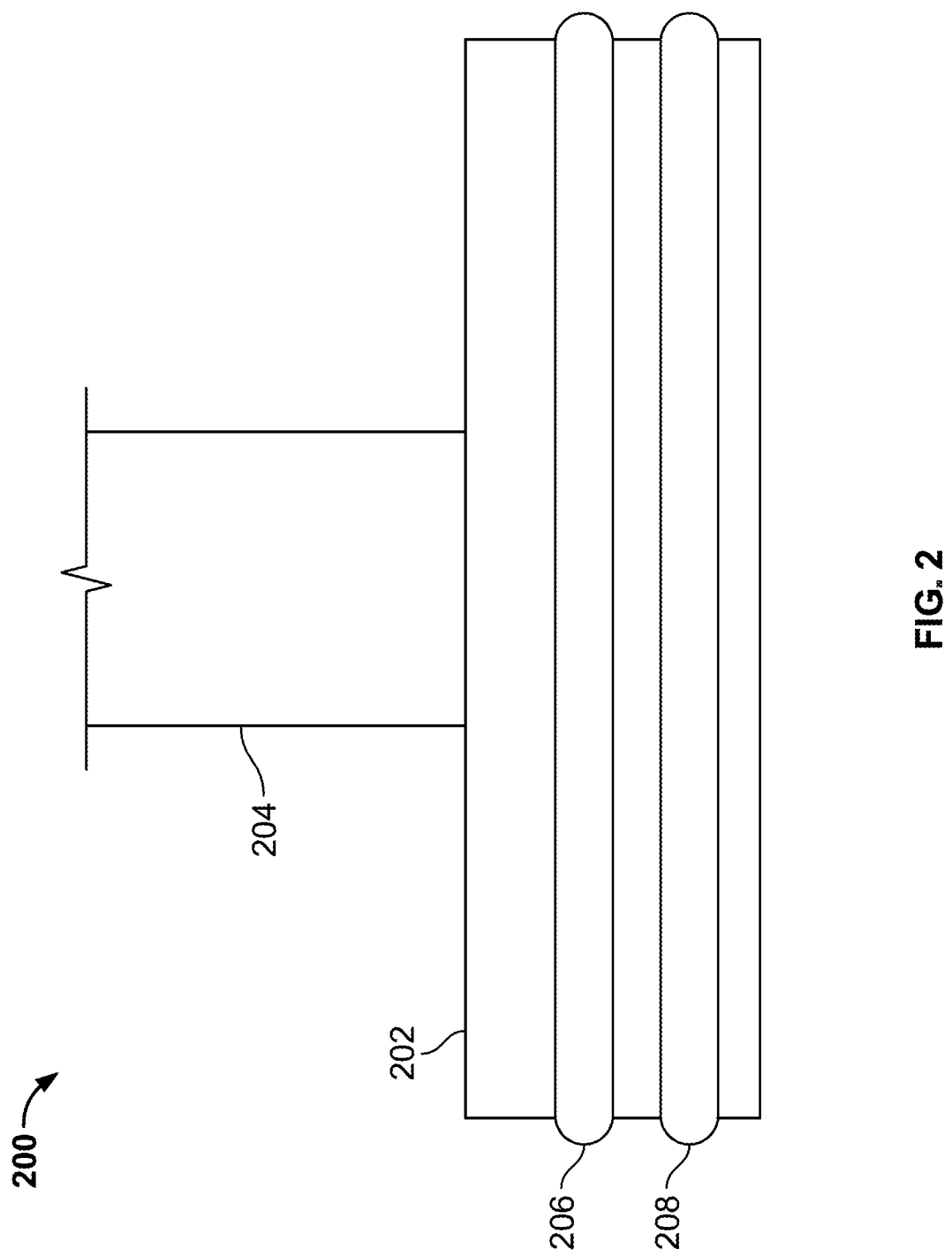
FIG. 2 is a side view of a piston head with two inflatable seals.

FIG. 2 is a side view of an example piston 200. The piston 200 includes a piston head 202 connected to a piston rod 204. Two inflatable seals 206, 208 are positioned around the outer circumference of the piston head 202. The inflatable seals 206, 208 form a static seal between the inflatable seals 206, 208 and the piston head 202. The seal prevents seepage of hydraulic fluid along the piston. The inflatable seals 206, 208 form a dynamic sliding seal with the cylindrical bore of a hydraulic cylinder when inserted into the hydraulic cylinder.

Figure 3A:
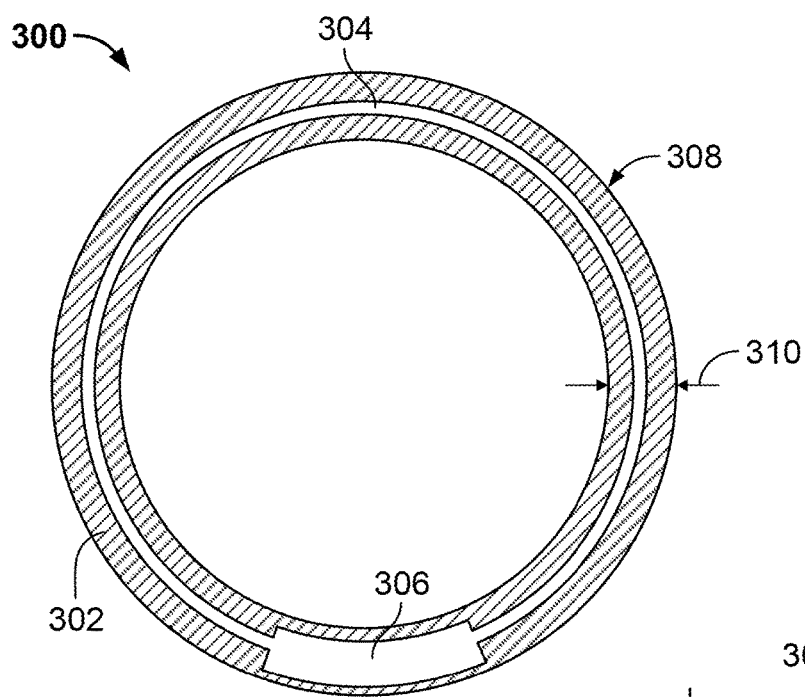
FIG. 3A is a top cross-section view of an inflatable seal with one chamber.

FIG. 3A is a top cross-section view of an example inflatable seal 300 (e.g., inflatable seal 206 or 208). The body 302 of the inflatable seal 300 can be formed from, for example, elastomers, fluoroelastomers, synthetic rubbers (e.g., nitrile), or natural rubber. The inflatable seal 300 can include nanofillers or nanoparticles in the primary elastomer matrix. Nanofillers are, for example, nano-sized additives in solid form which have different composition and structure than the primary elastomer matrix. Nanofillers generally include inorganic materials, and more rarely, organic materials. The body 302 has an interior cavity 304 extending through the center of the body 302. The body 302 also has a chamber 306. The chamber 306 can be filled with pressurized hydraulic fluid from a hydraulic cylinder. Hydraulic fluid from the chamber 306 can fill the interior cavity 304. As the interior cavity 304 fills, the inflatable seal 300 inflates. Inflation of the seal 300 causes an increase in the outer diameter 308 and/or thickness 310 of the seal 300. The inflatable seal 300 can maintain a seal against pressurized hydraulic fluid. For example, the inflatable seal 300 can withstand pressure of 90 psi or more, 100 psi or more, 150 psi or more.

Figure 3B:
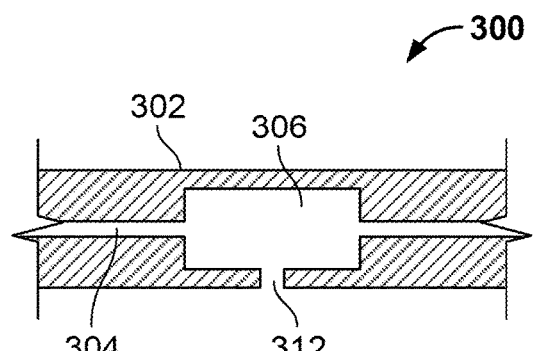
FIG. 3B is a partial side cross-section view of an inflatable seal.

FIG. 3B is a partial side cross-section view of the inflatable seal 300 showing the interior cavity 304 and chamber 306. The inflatable seal 300 includes a passageway 312 fluidly coupling the exterior of the inflatable seal 300 to the interior of the chamber 306. The passageway 312 has an opening with a smaller diameter than the diameter of the chamber 306.

Figure 3C:
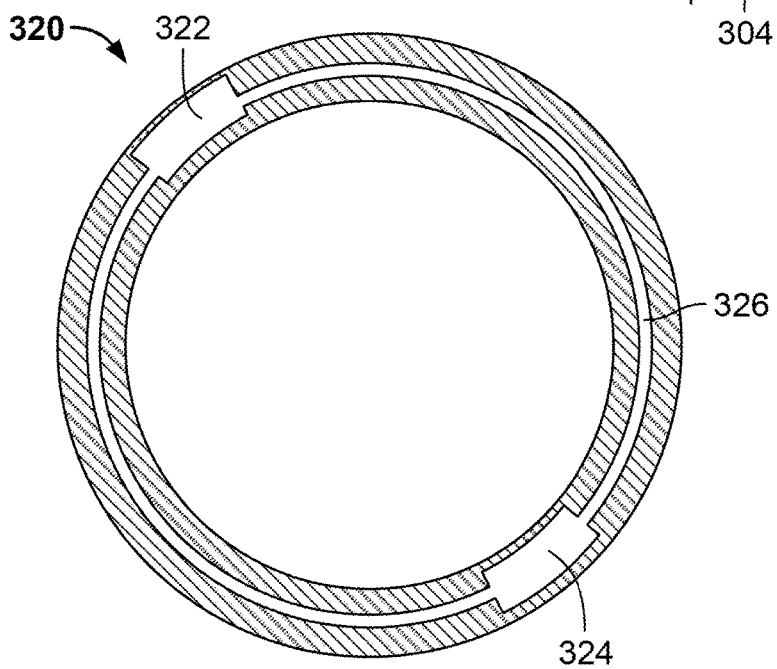
FIG. 3C is a top cross-section view of an inflatable seal with two chambers.

FIG. 3C is a top cross-section view of another example inflatable seal 320 with two chambers 322, 324. The inflatable seal 320 can be formed of similar materials as inflatable seal 300. Each chamber 322, 324 is coupled to the interior cavity 326 of the inflatable seal 320. Each chamber 322, 324 has a passageway (e.g., passageway 312) that fluidly couples the interior of the chamber 322, 324 with the exterior environment. The two chambers 322 and 324 are diametrically opposed (e.g., oriented on opposite sides of the inflatable seal 320 from each other).

Figure 4:
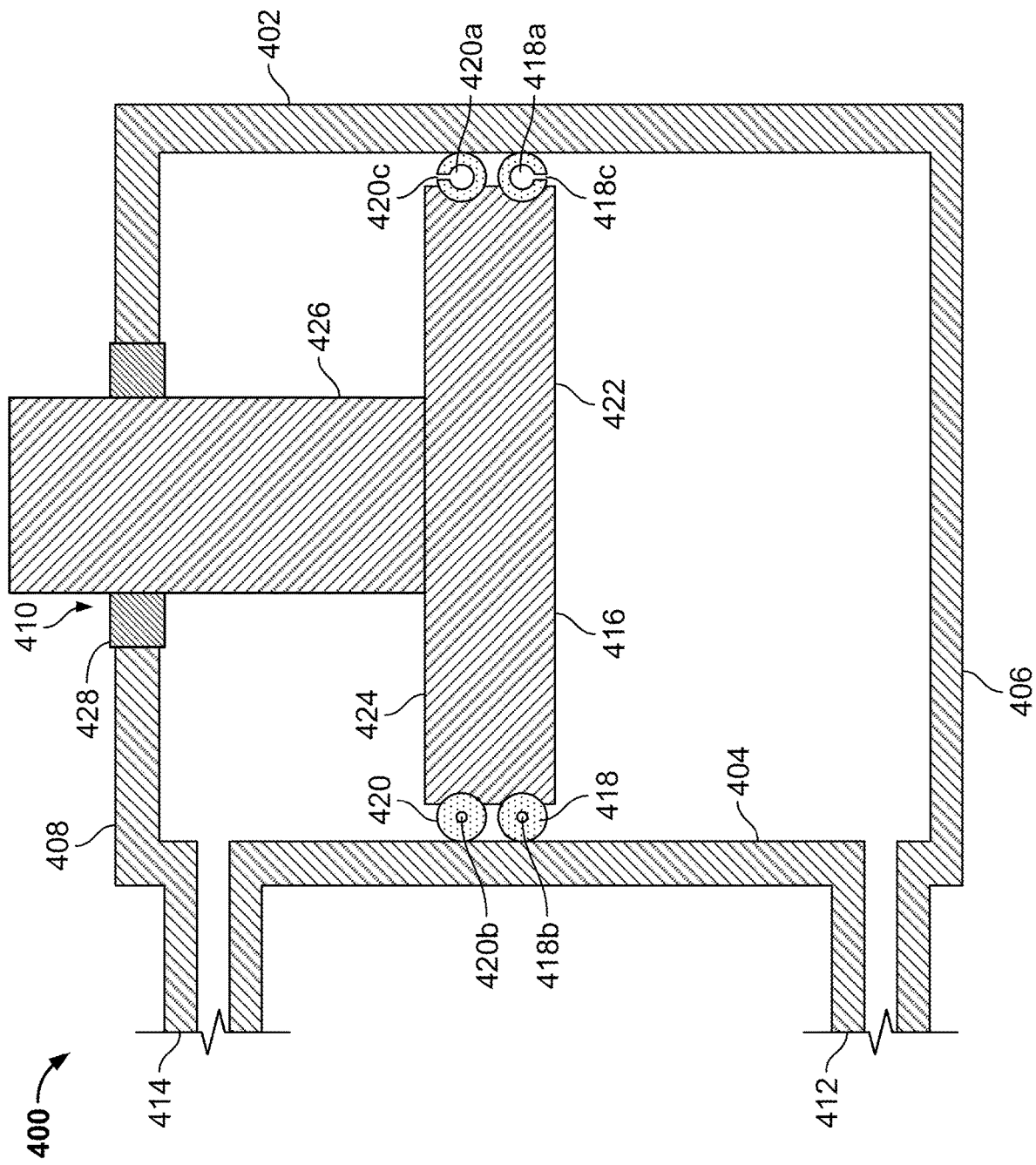
FIG. 4 is a side cross-section view of a hydraulic cylinder.

FIG. 4 is a cross-section view of a hydraulic cylinder or power cylinder 400. The hydraulic cylinder 400 includes a cylinder body 402. A cylindrical bore 404 is formed within the cylinder body 402. The cylindrical bore 404 extends from a first end 406 of the cylinder body 402 (e.g., bottom of the cylinder body) to a second end 408 of the cylinder body 402 (e.g., top of the cylinder body). An aperture 410 is defined in the second end 408 of the cylinder body 402. Two ports 412, 414 are located on the side of the cylinder body 402. The first port 412 is near the first end 406 of the cylinder body 402. The second port 414 is near the second end 408 of the cylinder body. The ports 412, 414 are coupled to a hydraulic system and allow hydraulic fluid to enter the cylindrical bore 404.

A piston head 416 is positioned within the cylindrical bore 404 and longitudinally located between the two ports 412, 414. Two inflatable seals 418, 420 (e.g., inflatable seal 300, 320) are disposed around the outer circumference of the piston head 416. The inflatable seals 418, 420 are static with respect to the piston head 416. The inflatable seals 418, 420 are in sliding contact with the cylindrical bore 404. The inflatable seals 418, 420 prevent hydraulic fluid seepage from the first side 422 of the piston head 416 to the second side 424 of the piston head 416.

The piston head 416 is connected to a piston rod 426. The piston rod 426 extends through the aperture 410 in the cylinder body 402. A static seal 428 (e.g., a U-seal) is positioned between the interior surface of the aperture 410 and the piston rod 426. The seal 428 prevents hydraulic fluid leakage from the cylindrical bore 404 to the outside environment. The seal 428 is in sliding contact with the piston rod 426. The seal 428 prevents hydraulic fluid from leaking out of the cylindrical bore by forming a seal between the edges of the aperture 410 and the piston rod 426. The seal 428 can include elastomers, fluoroelastomers, synthetic rubbers, or natural rubber. The seal 428 can include nanofillers or nanoparticles within the primary elastomer matrix.

Each inflatable seal 418, 420, includes a chamber 418a, 420a, and an interior cavity 418b, 420b. Each inflatable seal 418, 420, also includes a passageway 418c, 420c, that fluidly couples the interior of the cylindrical bore 404 with the interior of the chamber 418a, 420a.

In some implementations, the passageways 418c, 420c, are oriented to face an open portion (e.g., a portion not blocked by other elements) of the cylindrical bore 404. For example, inflatable seal 418 is located nearest the first side 422 of the piston head 416. The passageway 418c is oriented to receive hydraulic fluid from the portion of the cylindrical bore 404 between the first end 406 of the cylinder body 402 and the first side 422 of the piston head 416. Inflatable seal 420 is located nearest the second side 424 of the piston head 416. Correspondingly, the passageway 420c is oriented with the opening of the passageway 420c facing the portion of the cylindrical bore 404 between the second side 424 of the piston head 416 and the second end 408 of the cylinder body 402.

A steam turbine operator controls the position of a steam admission valve (e.g., steam admission valve 102) by operating the hydraulic cylinder 400. For example, to open the valve, the operator provides pressurized hydraulic fluid through the first port 412. The pressurized hydraulic fluid acts on the first side 422 of the piston head 416 moving the piston head 416 toward the second end 408 of the cylinder body 402. As the piston head 416 moves, hydraulic fluid flows out of the second port 414 and returns to a reservoir of hydraulic fluid. To close the steam admission valve, the operator provides pressurized hydraulic fluid through the second port 414 which acts on the second side 424 of the piston head 416. As the piston head 416 moves toward the first end 406 of the cylinder body, hydraulic fluid flows out through the first port 412 to return to the reservoir of hydraulic fluid.

A number of implementations of these systems and methods have been described. Nevertheless, it will be understood that various modifications may be made without departing from the spirit and scope of this disclosure. Accordingly, other implementations are within the scope of the following claims.

EXAMPLES

In an example implementation, a hydraulic cylinder piston includes a piston rod having a first end and a second end opposite the first end; a piston head coupled to the first end of the piston rod; and two inflatable seals disposed around an outer circumference of the piston head, each inflatable seal including one or more chambers configured to receive hydraulic fluid to inflate the seal.

In an aspect combinable with the example implementation, the inflatable seals are in sliding contact with a hydraulic cylinder wall.

In another aspect combinable with any of the previous aspects, the second end of the piston rod is coupled to a cross arm of a steam admission valve.

In another aspect combinable with any of the previous aspects, the inflatable seals include a fluoroelastomer or a synthetic rubber.

In another aspect combinable with any of the previous aspects, the inflatable seals include a nanofiller.

In another aspect combinable with any of the previous aspects, each chamber includes a passageway from an exterior of the inflatable seal to an interior of the chamber.

In another aspect combinable with any of the previous aspects, each inflatable seal includes an interior cavity fluidly coupled to the one or more chambers.

In another aspect combinable with any of the previous aspects, each inflatable seal includes two diametrically opposed chambers configured to receive hydraulic fluid to inflate the seals.

In another example implementation, a hydraulic cylinder assembly includes a cylinder body including a cylindrical bore extending longitudinally from a first end of the cylinder body to a second end of the cylinder body opposite the first end; a first port disposed on a side of the cylinder body adjacent the first end; a second port disposed on the side of the cylinder body adjacent the second end; and an aperture defined in the second end of the cylinder body; a piston rod extending through the aperture; a piston head coupled to a first end of the piston rod, the piston head disposed in the cylindrical bore of the cylinder body between the first and second ports; a first and a second inflatable seal disposed around an outer circumference of the piston head, the inflatable seals in sliding contact with the cylindrical bore; and a third seal disposed around an interior circumference of the aperture, the third seal in sliding contact with the piston rod.

An aspect combinable with the example implementation includes a cross arm having a first end and a second end opposite the first end, the first end of the cross arm coupled to a second end of the piston rod opposite the first end of the piston rod.

Another aspect combinable with any of the previous aspects includes a steam admission valve coupled to the second end of the cross arm, the steam admission valve configured to control an amount of steam admitted into a steam turbine.

In another aspect combinable with any of the previous aspects, the first and second inflatable seals and the third seal each include a fluoroelastomer or a synthetic rubber.

In another aspect combinable with any of the previous aspects, the first and second inflatable seals and the third seal each include a nanofiller.

In another aspect combinable with any of the previous aspects, the first and the second inflatable seals each include one or more chambers configured to receive hydraulic fluid to inflate the seal.

In another aspect combinable with any of the previous aspects, each chamber includes a passageway with a first opening on an exterior surface of the inflatable seal and a second opening on an interior surface of the chamber.

In another aspect combinable with any of the previous aspects, the first opening of the passageway on the first inflatable seal is on an exterior surface of the first inflatable seal oriented toward the first end of the cylinder body.

In another aspect combinable with any of the previous aspects, the first opening of the passageway on the second inflatable seal is on an exterior of the second inflatable seal oriented toward the second end of the cylinder body.

In another aspect combinable with any of the previous aspects, the first and the second inflatable seals each include an interior cavity fluidly coupled to the one or more chambers.

In another aspect combinable with any of the previous aspects, the first and second inflatable seals each include two diametrically opposed chambers configured to receive hydraulic fluid to inflate the seals.

What is claimed is:

1. A hydraulic cylinder piston comprising:
   a piston rod having a first end and a second end opposite the first end;
   a piston head coupled to the first end of the piston rod; and
   two inflatable seals disposed around an outer circumference of the piston head, each inflatable seal comprising one or more chambers configured to receive hydraulic fluid to inflate the seal;
   wherein each inflatable seal comprises an interior cavity fluidly coupled to the one or more chambers.

2. The hydraulic cylinder piston of claim 1, wherein the inflatable seals are in sliding contact with a hydraulic cylinder wall.

3. The hydraulic cylinder piston of claim 1, wherein the inflatable seals comprise a fluoroelastomer or a synthetic rubber.

4. The hydraulic cylinder piston of claim 3, wherein the inflatable seals comprise a nanofiller.

5. The hydraulic cylinder piston of claim 1, wherein each chamber comprises a passageway from an exterior of the inflatable seal to an interior of the chamber.

6. A hydraulic cylinder piston comprising:
   a piston rod having a first end and a second end opposite the first end;
   a piston head coupled to the first end of the piston rod; and
   two inflatable seals disposed around an outer circumference of the piston head, each inflatable seal comprising one or more chambers configured to receive hydraulic fluid to inflate the seal;
   wherein the second end of the piston rod is coupled to a cross arm of a steam admission valve.

7. A hydraulic cylinder piston comprising:
   a piston rod having a first end and a second end opposite the first end;
   a piston head coupled to the first end of the piston rod; and
   two inflatable seals disposed around an outer circumference of the piston head, each inflatable seal comprising one or more chambers configured to receive hydraulic fluid to inflate the seal;
   wherein each inflatable seal comprises two diametrically opposed chambers configured to receive hydraulic fluid to inflate the seals.

8. A hydraulic cylinder assembly comprising:
   a cylinder body comprising:
   a cylindrical bore extending longitudinally from a first end of the cylinder body to a second end of the cylinder body opposite the first end;
   a first port disposed on a side of the cylinder body adjacent the first end;
   a second port disposed on the side of the cylinder body adjacent the second end; and
   an aperture defined in the second end of the cylinder body;
   a piston rod extending through the aperture;
   a piston head coupled to a first end of the piston rod, the piston head disposed in the cylindrical bore of the cylinder body between the first and second ports;
   a first and a second inflatable seal disposed around an outer circumference of the piston head, the inflatable seals in sliding contact with the cylindrical bore; and
   a third seal disposed around an interior circumference of the aperture, the third seal in sliding contact with the piston rod.

9. The hydraulic cylinder assembly of claim 8, further comprising: a cross arm having a first end and a second end opposite the first end, the first end of the cross arm coupled to a second end of the piston rod opposite the first end of the piston rod.

10. The hydraulic cylinder assembly of claim 9, further comprising: a steam admission valve coupled to the second end of the cross arm, the steam admission valve configured to control an amount of steam admitted into a steam turbine.

11. The hydraulic cylinder assembly of claim 8, wherein the first and second inflatable seals and the third seal each comprise a fluoroelastomer or a synthetic rubber.

12. The hydraulic cylinder assembly of claim 11, wherein the first and second inflatable seals and the third seal each comprise a nanofiller.

13. The hydraulic cylinder assembly of claim 8, wherein the first and the second inflatable seals each comprise one or more chambers configured to receive hydraulic fluid to inflate the seal.

14. The hydraulic cylinder assembly of claim 13, wherein each chamber comprises a passageway with a first opening on an exterior surface of the inflatable seal and a second opening on an interior surface of the chamber.

15. The hydraulic cylinder assembly of claim 14, wherein the first opening of the passageway on the first inflatable seal is on an exterior surface of the first inflatable seal oriented toward the first end of the cylinder body.

16. The hydraulic cylinder assembly of claim 15, wherein the first opening of the passageway on the second inflatable seal is on an exterior of the second inflatable seal oriented toward the second end of the cylinder body.

17. The hydraulic cylinder assembly of claim 13, wherein the first and the second inflatable seals each comprise an interior cavity fluidly coupled to the one or more chambers.

18. The hydraulic cylinder assembly of claim 8, wherein the first and second inflatable seals each comprise two diametrically opposed chambers configured to receive hydraulic fluid to inflate the seals.

* * * * *